US009019646B2

(12) United States Patent
Rausch et al.

(10) Patent No.: US 9,019,646 B2
(45) Date of Patent: *Apr. 28, 2015

(54) HEAT ASSISTED MAGNETIC RECORDING DEVICE WITH PRE-HEATED WRITE ELEMENT

(71) Applicant: Seagate Technology LLC, Cupertino, CA (US)

(72) Inventors: Tim Rausch, Farmington, MN (US); Jon D. Trantham, Chanhassen, MN (US); John West Dykes, Eden Prairie, MN (US); Housan Dakroub, Shakopee, MN (US); Charles Paul Henry, Greenfield, MN (US); Edward Charles Gage, Lakeville, MN (US); Raul Horacio Andruet, Woodbury, MN (US); James Gary Wessel, Savage, MN (US); James Dillon Kiely, Edina, MN (US); Bruce Douglas Buch, Westborough, MA (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/831,129

(22) Filed: Mar. 14, 2013

(65) Prior Publication Data

US 2014/0029396 A1 Jan. 30, 2014

Related U.S. Application Data

(63) Continuation-in-part of application No. 13/687,282, filed on Nov. 28, 2012.

(60) Provisional application No. 61/676,835, filed on Jul. 27, 2012.

(51) Int. Cl.
*G11B 5/02* (2006.01)
*G11B 13/04* (2006.01)
(Continued)

(52) U.S. Cl.
CPC ............... *G11B 13/04* (2013.01); *G11B 5/314* (2013.01);
(Continued)

(58) Field of Classification Search
CPC ........ G11B 7/00; G11B 7/004; G11B 7/0045; G11B 7/00451; G11B 7/1203; G11B 7/1205; G11B 7/1206; G11B 7/122; G11B 7/123; G11B 7/124; G11B 7/1384; G11B 7/1387; G11B 2007/00; G11B 2007/004; G11B 2007/0045; G11B 5/00; G11B 5/012; G11B 5/02; G11B 5/1278; G11B 5/187; G11B 5/1871; G11B 5/23; G11B 5/56; G11B 5/58; G11B 5/581; G11B 5/60; G11B 5/6005; G11B 5/6011; G11B 5/607; G11B 5/6088; G11B 2005/00; G11B 2005/0021
See application file for complete search history.

(56) References Cited

U.S. PATENT DOCUMENTS 6,975,472 B2 12/2005 Stover et al.
(Continued)

FOREIGN PATENT DOCUMENTS

JP 2004030898 1/2004
(Continued)

OTHER PUBLICATIONS

U.S. Appl. No. 13/687,282, filed Nov. 28, 2012, Andruet et al.
(Continued)

*Primary Examiner* — Regina N Holder
*Assistant Examiner* — Brian Butcher
(74) *Attorney, Agent, or Firm* — Hollingsworth Davis, LLC (57) ABSTRACT

An apparatus includes a write element configured to apply a magnetic field to write data on a portion of a heat-assisted magnetic recording media in response to an energizing current. An energy source is configured to heat the portion of the media being magnetized by the write element. A preheat energizing current is applied to the write element during an interval before writing the data to the portion of the media. The preheat energizing current does not cause data to be written to the media and brings at least one of the write element and driver circuitry into thermal equilibrium prior to writing the data on the portion.

19 Claims, 8 Drawing Sheets (51) Int. Cl.
   *G11B 5/31*   (2006.01)
   *G11B 5/60*   (2006.01)
   *G11B 5/00*   (2006.01)

(52) U.S. Cl.
   CPC ...... *G11B 5/6088* (2013.01); *G11B 2005/0021* (2013.01)

(56) References Cited

U.S. PATENT DOCUMENTS

| | | |
|---|---|---|
| 7,119,990 B2 | 10/2006 | Bajorek et al. |
| 7,190,543 B2 | 3/2007 | Suk |
| 7,212,381 B2 | 5/2007 | Mei et al. |
| 7,215,495 B1 | 5/2007 | Che et al. |
| 7,283,327 B1 | 10/2007 | Liu et al. |
| 7,375,912 B2 | 5/2008 | Brannon et al. |
| 7,375,914 B1 | 5/2008 | Dieron et al. |
| 7,388,726 B1 | 6/2008 | McKenzie et al. |
| 7,457,072 B2 | 11/2008 | Dieron et al. |
| 7,538,961 B2 | 5/2009 | Lamberts et al. |
| 7,589,936 B1 | 9/2009 | McFadyen et al. |
| 7,593,187 B2 | 9/2009 | Aoki |
| 7,660,080 B1 | 2/2010 | Liu et al. |
| 7,889,450 B2 | 2/2011 | Vikramaditya |
| 8,456,980 B1 * | 6/2013 | Thayamballi .................. 360/59 |
| 2004/0252396 A1 | 12/2004 | Pleiss |
| 2006/0028765 A1 | 2/2006 | Coffey et al. |
| 2008/0068739 A1 | 3/2008 | Oyamada et al. |
| 2010/0103783 A1 | 4/2010 | Gill et al. |
| 2010/0232050 A1 | 9/2010 | Schreck et al. |
| 2011/0267715 A1 | 11/2011 | Heim et al. |
| 2011/0299367 A1 * | 12/2011 | Naniwa et al. ............. 369/13.33 |
| 2012/0092789 A1 | 4/2012 | Hsiao et al. |
| 2012/0099218 A1 | 4/2012 | Kurita et al. |
| 2013/0170331 A1 * | 7/2013 | Contreras et al. .......... 369/13.33 |
| 2013/0293984 A1 | 11/2013 | Poss et al. |

FOREIGN PATENT DOCUMENTS

| | | |
|---|---|---|
| JP | 2004241105 | 8/2004 |
| JP | 2004355739 | 12/2004 |
| JP | 2006155708 | 6/2006 |
| JP | 2011258255 | 12/2011 |
| WO | WO2006100718 | 9/2006 |

OTHER PUBLICATIONS

File History for U.S. Appl. No. 13/687,282.
Office Action with translation dated Jul. 25, 2014 for KR Application No. 10-2013-0088731, 5 pages.
European Search Report dated Nov. 12, 2013 for EP Application No. 13178288.0, 7 pages.

* cited by examiner

HEAT ASSISTED MAGNETIC RECORDING DEVICE WITH PRE-HEATED WRITE ELEMENT

RELATED PATENT DOCUMENTS

This is a continuation-in-part of U.S. patent application Ser. No. 13/687,282 filed on Nov. 28, 2012, and further claims the benefit of Provisional Patent Application Ser. No. 61/676,835 filed on Jul. 27, 2012, to which priority is claimed pursuant to 35 U.S.C. §119(e), both of which are hereby incorporated herein by reference in their entirety.

SUMMARY

Examples described herein are directed to a heat-assisted magnetic recording device. In one embodiment, an apparatus includes a write element configured to apply a magnetic field to write data on a portion of a heat-assisted magnetic recording media in response to an energizing current. An energy source is configured to heat the portion of the media being magnetized by the write element. A preheat energizing current is applied to the write element during an interval before writing the data to the portion of the media. The preheat energizing current does not cause data to be written to the media and brings at least one of the write element and driver circuitry into thermal equilibrium prior to writing the data on the portion.

In another embodiment, methods and apparatuses facilitate determining that data will be written to a portion of a heat-assisted magnetic recording medium. A preheat energizing current is applied to a write element during an interval before writing the data to the portion of the medium. The write element applies a magnetic field to the medium in response to the preheat energizing current. The preheat energizing current does not cause other data to be written to the medium and brings at least one of the write element and driver circuitry into thermal equilibrium prior to writing the data on the portion. After the interval, an energy source configured to heat the portion of the medium energized and an energizing current is applied to the write element to write data to the portion of the medium.

In another embodiment, while a heat-assisted, magnetic recording media is not being written to, heat applied from a write head to the recording media is removed. The heat facilitates writing to the recording media. Power is applied to a write coil of the write head to control spacing between the write head and the recording media when the recording media is not being written.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

This disclosure is related to the use of preheating a write element (e.g., a write coil) and related circuitry in order to achieve thermal equilibrium in a heat-assisted magnetic recording (HAMR) device. In one embodiment, the writer coil and driver circuitry preheating is controlled externally, e.g., via a system controller. The same outcome can also be realized in the preamp via firmware-controlled registers affecting internal preamp circuits. Other permutations of control are also possible. Writer coil current is applied in advance of the actual write operation, thereby simplifying the control of fly-height for writer protrusion during an active write operation.

In HAMR devices, also sometimes referred to as thermal-assisted magnetic recording (TAMR) devices, heat energy is used in conjunction with magnetic fields applied to a magnetic recording media (e.g., a hard drive disk) to overcome superparamagnetic effects that limit the areal data density of traditional magnetic media. In a HAMR recording device, information bits are recorded on a storage layer at elevated temperatures. The heated area in the storage layer determines the data bit dimension, and linear recording density is determined by the magnetic transitions between the data bits.

In order to achieve desired data density, a HAMR recording head (e.g., slider) includes optical components that direct, concentrate, and transform light energy from an energy source, such as a laser diode, to heat on the recording media. The HAMR media hotspot may need to be smaller than a half-wavelength of light available from economical sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to have a surface plasmon resonance at the designed light wavelength. At resonance, a high electric field surrounds the NFT due to the collective oscillation of electrons in the metal. Part of the field tunnels into the storage medium and is absorbed, raising the temperature of the medium locally above the Curie point for recording. Without the presence of the heat energy, the media will be below the Curie point, and no effective erasure or re-magnetization will occur, even if the magnetic field from the writer is present. However, it is implicitly understood that the magnetic transitions are defined (magnetically frozen) at temperatures less than the Curie temperature.

Figure 1:
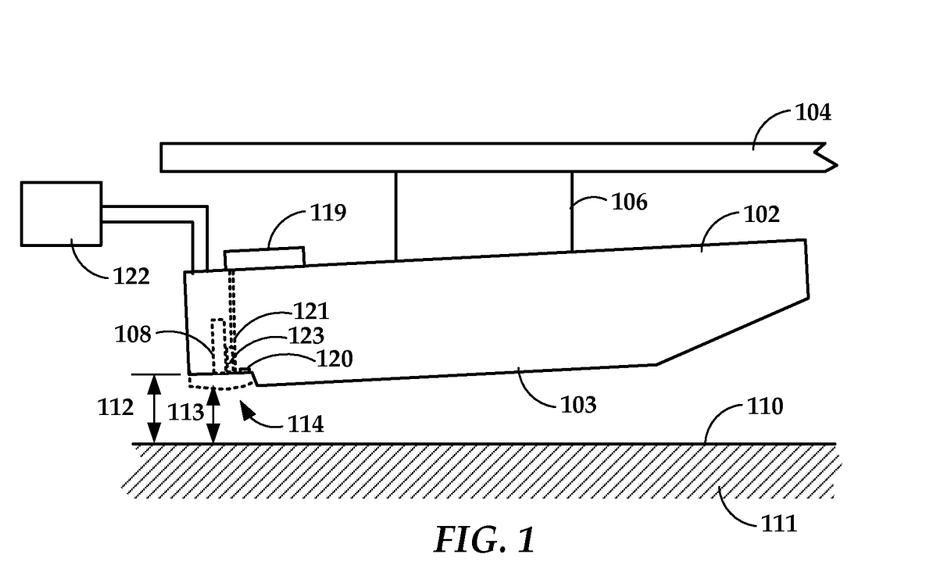
FIG. 1 is a side view of a slider according to an example embodiment.

A HAMR drive may use a laser and a near field transducer to heat the media to aid in the recording process. Due to inefficiencies of the optical transmission path, the laser and near field transducer also heat the head/slider. The heating can originate from the NFT, the light delivery optics and/or from the laser itself. Energy absorbed in these components may be converted to heat, which is conducted to the surrounding materials. This heating can lead to head-media spacing (HMS) changes by causing the writer element to protrude (i.e. fly closer to the disk) through slider thermal expansion or by changing the shape of the slider and changing the air bearing characteristics. An example of this is shown in FIG. 1, which illustrates a side view of a slider 102 according to an example embodiment.

For controlling the laser in some HAMR drive embodiments, a technique known as pulsing is used. Pulsing flashes the laser in synchronization with magnetic transitions from the writer coil. The timing of the pulsing with respect to the transitions can affect the bit error rate of the recording system. The timing of these transitions is affected by electrical delays through the preamp driver circuitry, and these delay times may be affected by the temperature of the circuitry. One additional result of early and/or continual application of writer coil current is in bringing the driver circuitry into thermal equilibrium to minimize the timing delay shift.

The slider 102 is coupled to an arm (not shown) by way of a suspension 104, attached to a gimbal 106 that allows some relative motion between the slider 102 and suspension 104. The slider 102 includes read/write transducers 108 at a trailing edge that are held proximate to a surface 110 of a magnetic recording medium, e.g., disk 111. When the slider 102 is located over surface 110 of disk 111, a flying height 112 is maintained between the slider 102 and the surface 110 by a downward force of the suspension 104. This downward force is counterbalanced by an air cushion that exists between the surface 110 and an air bearing surface (ABS) 103 of the slider 102 when the disk 111 is rotating.

It is desirable to maintain a predetermined spacing between writer and reader elements and the media 112 over a range of cylindrical disk positions during both reading and writing operations to ensure consistent performance. A region 114 is a "close point" of the slider 102, which is generally understood to be the closest point of contact between the slider 102 and the magnetic recording medium 111, and generally defines the HMS 113. Heating from HAMR optical components can affect the HMS 113.

Heating from the writer coil current can affect the HMS 113. In this example, the geometry change may be induced, in whole or in part, by an increase or decrease in temperature of the region 114 due to different thermal expansion properties of the respective materials surrounding the region. This is shown in FIG. 1 by dotted line that represents a change in geometry of the region 114. Example HAMR components that may induce these temperature changes include a top mounted laser 119, waveguide 121, and NFT 123. To control spacing, many recording heads additionally include one or more internal heaters (not shown) to deliberately add heat. In one exemplary embodiment, the slider 102 contains two heaters. The first additional heater is in close proximity to the reader element and is referred to as the reader-heater. The second heater is in close proximity to the writer element and is referred to as the writer-heater.

The slider 102 may include a resistive temperature sensor 120 located at or proximate to region 114. This sensor 120 has a temperature coefficient of resistance (TCR) that enables high precision measurements of temperature (or temperature change) at the region 114, and so is sometimes referred to as a TCR sensor. The TCR sensor 120 is coupled to control circuitry 122. The control circuitry 122 communicates with the sensor 120, as well as other electrical components of the slider 102. Two or more TCR sensors 120 may be employed, e.g., disposed in physically separate locations from each other. Multiple sensors 120 be wired separately from each other, or together (e.g., in series or parallel) to reduce the number of connections needed for the slider 102.

With a HAMR recording device, four protrusions may need to be managed at the ABS during write, each with different time constants: writer-heater protrusion (~100 µs); writer coil protrusion (~100 µs); NFT protrusion (~1 µs us followed by ~100 µs); and laser heating of slider (~1000 µs). Conventional HAMR preamps turn on the writer coil simultaneously with the laser. This results in an interaction between the writer-coil and the NFT induced protrusions. Due to the high coercivity of HAMR media the head cannot write to the media unless the laser is active. This means writer-coil and writer-heater currents can be enabled prior to writing, which allows them to reach thermal equilibrium by the time writing occurs. This means only thermal protrusion dynamics from the laser need be considered since everything else is in thermal equilibrium.

Accordingly, a preamp according to an example embodiment may be modified to apply a current through the writer in advance of sector(s) being written. In such a configuration, the writer coil current can either be kept on or turned off during sector gaps and servo gates (SG), so long as the laser is off during those times. It may be preferable to turn off the writer current during SG to avoid coupling into the read head and affecting the servo system.

The pre-heat current applied to the writer coil can be alternating current (AC) or direct current (DC). An AC signal may avoid any pitfalls with DC magnetic fields, although a DC signal may be required if the writer-coil current is left on during SG in order to reduce electrical noise. For example, U.S. Pat. No. 7,088,537 by Cronch et al describes a degauss mode in a disk drive preamp. The degauss mode circuitry in the preamp (or similar) can be used as a control source for the AC current for this purpose. The AC signal can either be internally generated within the preamp and/or externally generated by the system read channel (SRC), which is part of the system controller, e.g., the hard-drive's main controller application-specific integrated circuit (ASIC). Either approach is acceptable and both are shown here.

Figure 2:
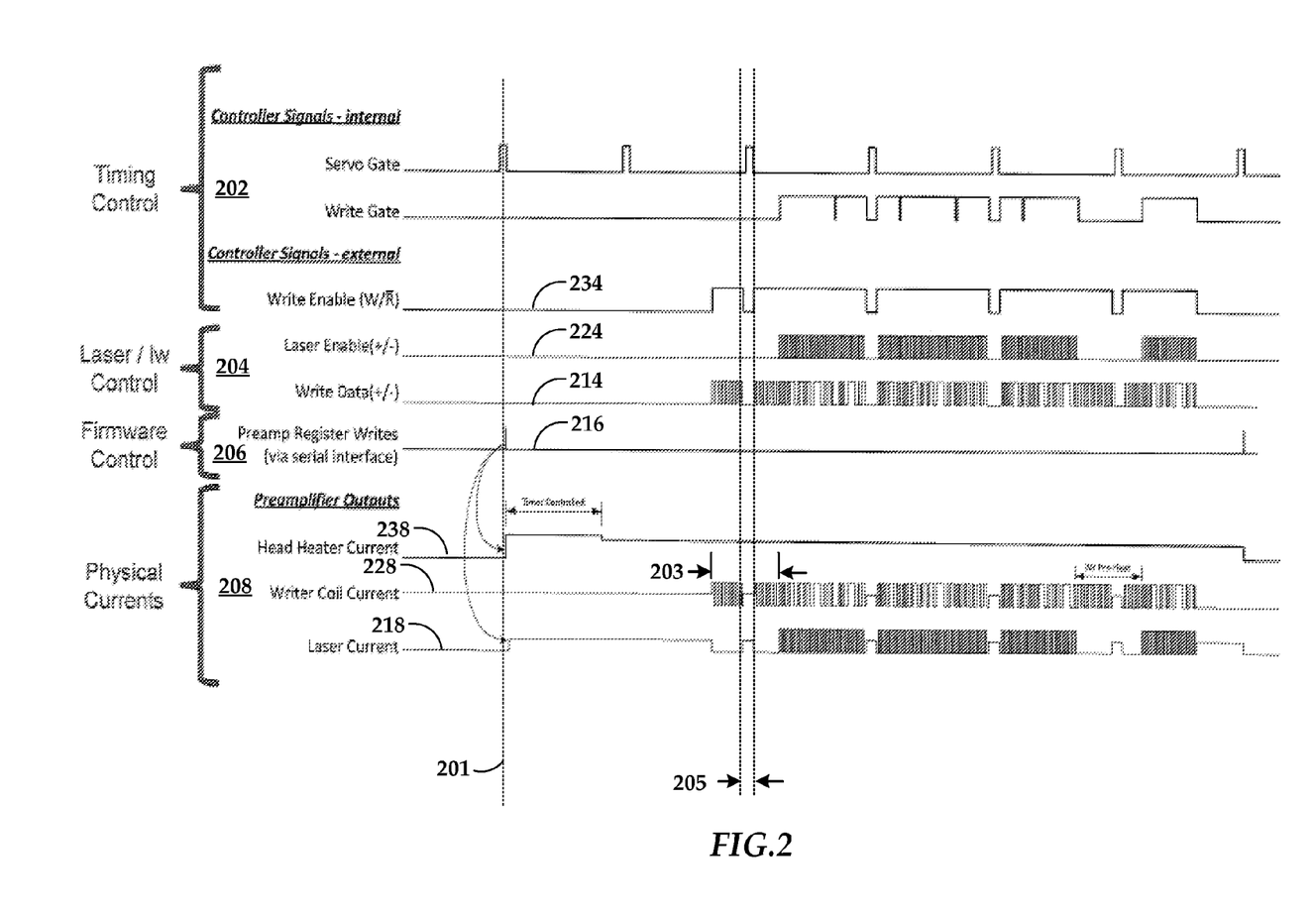
FIG. 2 is a timing diagram illustrating pre-heating of a slider according to example embodiments.

In reference now to FIG. 2 a timing diagram shows an example of how a recording head may be preheated according to an example embodiment. The diagram is divided into four types of signals: timing control 202, laser and channel writer control 204, firmware control 206, and physical currents 208.

As illustrated by trace 216, the firmware writes preamp registers to set the current for laser bias and the writer coil in advance of the write operation, at time 201. The firmware enables preheating with enough time for the writer-heater current 238 and writer-coil current 228 to cause their affected components to reach thermal equilibrium. The preheating time for the writer-coil is indicated in FIG. 2 by interval 203.

Figure 3:
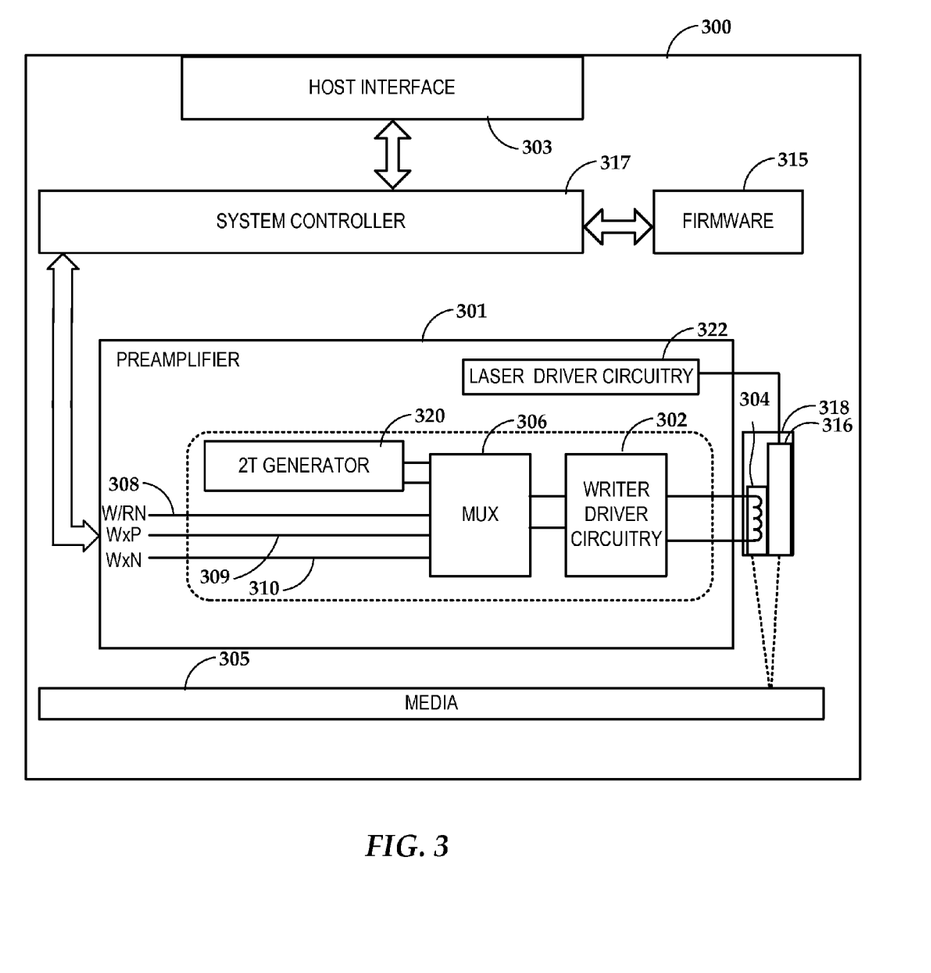
FIG. 3 is a block diagram of an apparatus according to an example embodiment.

The firmware can optionally enable a new preamp feature that sends current to writer coils using an internally generated AC or DC signal. An example of this is seen in FIG. 3, which is a block diagram of an apparatus 300 according to an example embodiment. The apparatus 300 includes a system controller 317 that may include one or more logic circuits that control functions of the apparatus 300. The system controller 317 receives commands via a host interface 303. In response to write commands from the host interface 303, the system controller 317 causes a write preamplifier assembly 301 to write data to a magnetic data storage medium 305.

The preamplifier assembly 301 includes writer-coil driver circuitry 302 that drives one or more write coils 304 contained within recording head 318. The write coil 304 creates a magnetic field in response to a current being applied. The preamp 301 is controlled by combining, via multiplexer 306, write enable line 308, and write data signals (WDATA+/−) 309, 310 amongst other control signals not shown. The apparatus includes firmware 315 that, in conjunction with the system controller 317, enables the preamplifier assembly 301 to send current to the writer coil 304 using an internally generated AC or DC signal The AC signal may be generated by an internal oscillator 320, such as what is used for degaussing operations. This alleviates the necessity to control the write data signal (WDATA+/−) 309, 310 to perform the preheat signaling. The writer-coil preheating may be turned off during servo (e.g., during period 205 in FIG. 2) to minimize cross talk between the writer and reader lines on the flex on suspension (FOS).

The apparatus 300 further includes an energy source 316 (e.g., a concentrated laser diode output) that heats a portion of the medium 305 currently being magnetized by the write coil 304. The energy source 316 is enabled via the system controller 317 (e.g., via laser enable line 224 in FIG. 2) to heat a portion of the medium 305 during recording. For purposes of this discussion, the "portion of the medium" may include a region larger than a signal bit of data being written. For example, the portion may include multiple hard drive sectors, and writing may be suspended and resumed during writing of the portion, e.g., when traversing servo marks.

As described herein, activation of the write coil 304 when the energy source 316 is not energized will generally not cause other data to be written to the medium 305 (e.g., no significant change in local magnetic orientation at the medium) nor any existing data to be obliterated. It is noteworthy that, in some designs utilizing a semiconductor laser diode as an energy source, it is desirable to still have a small current flowing through the laser diode while not writing. For purposes of this disclosure, the laser can still be thought of as being de-energized even when a small bias current is present, so long as the laser is not sufficiently lasing to raise the media temperature near or above its Curie point. As such, in some cases the write coil 304 may be activated by an energizing current to bring a write element (e.g., the write coil 304, write pole, and associated components) into thermal equilibrium without writing other data to the medium 305 while activated. In order to achieve this, the energy source 316 and write coil 304 may be controlled via separate signals.

In reference again to FIG. 2, signals 214, 224, and 234 are generally considered part of the system controller's read channel's writer and laser controls. The channel controls a writer-enable (W/Rn) line (signal 234), as well as the write data lines (signal 214) and the laser enable line (signal 224). The channel enables the laser whenever it wants to write data to the disk. The laser enable line is not the same as W/Rn since it may be needed to keep from writing consecutive sectors when such writing is not needed. Separating these lines also allows for pulsing control and the ability for writer pre-heat. In continuous writing mode the laser control is a logic signal. For pulsed recording the logic gate may be replaced by high-bandwidth laser data.

Signals 218, 228, and 238 are physical currents that are output to the laser, writer coil, and heater, respectively. The laser current 218 as shown is for a pulsed laser. If this was a CW implementation, the laser current would switch on at the start of the sector and remain steady for the duration. Data is only written to the disk when laser current 218 is sufficient for lasing. With no or reduced laser current 218, the field from the head is insufficient to mark the disk. However, with no writer current 228, the laser will still erase the disk.

Figure 4:
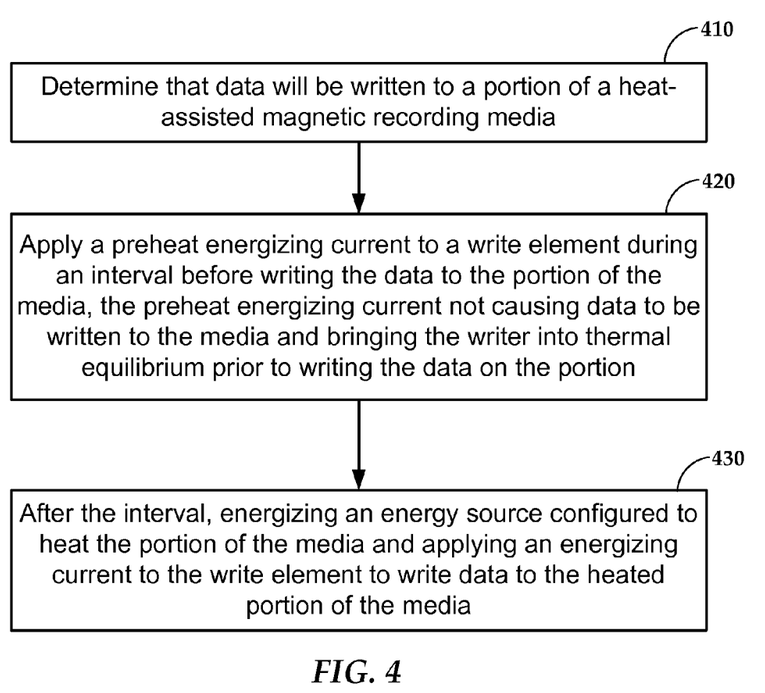
FIG. 4 is a flowchart illustrating a procedure according to an example embodiment.

In FIG. 4, a flowchart illustrates a procedure for preheating a write element according to an example embodiment. It is determined 410 (e.g., by a system controller) that data will be written to a portion of a HAMR media. A preheat energizing current is applied 420 to a write element during an interval before writing the data to the portion of the media. The preheat energizing current does not cause data to be written to the media and brings the writer into thermal equilibrium (which is understood to include maintaining an existing thermal equilibrium) prior to writing the data on the portion. After the interval, an energy source (e.g., a laser diode) is energized 430. The energy source is configured to heat the portion of the media and an energizing current is applied to the write element to write data to the heated portion of the media According to various implementations, HAMR may be used in combination with recording on Bit Patterned Media (BPM). BPM formats may include various fields, such as timing recovery and servo fields, embedded within data areas of the media. According to various implementations, timing fields that are embedded within the data areas of the media are read while on-going write operations are suspended. It may be advantageous to keep writer coil current on when the writer pole traverses these fields to eliminate format overhead associated with the non-zero times it takes to turn write current off and back on during the reading of the timing fields.

Additionally, bit patterned media implementations may require precise timing of magnetic field transitions and/or laser pulsing in synchronization with bits on the media. The timing of these transitions is affected by electrical delays through the preamp driver circuitry, and these delay times may be affected by the temperature of the circuitry. One additional result of early and/or continual application of writer coil current is in bringing the driver circuitry into thermal equilibrium to minimize the timing delay shift.

According to various implementations, writer turn-on/turn-off overhead is reduced by leaving DC write current on while reading the timing fields. For example, when timing fields are patterned such that unipolar magnetization can be used, write transition overhead can be eliminated by writing DC of the same polarity when the writer pole traverses the unipolar field with the laser off or on. However, in some cases, bipolar-written fields such as runout correction values may be corrupted by a DC write. Therefore, it may be useful in some cases to turn off the laser off when reading the timing fields to prevent overwrite and/or corruption of the data.

It may be useful to eliminate writer turn-on/turn-off overhead and achieve faster thermal equilibrium by leaving DC write current and laser on while over unipolar BPM servo fields. However, in some cases, within or abutting these servo fields, there may be bipolar-written information fields (such as runout correction values) that would be corrupted by a DC write. Thus it would be advantageous in a HAMR+BPM system to turn off the laser during unipolar fields to enable leaving write current on without risk of corrupting bipolar information fields.

Figure 5:
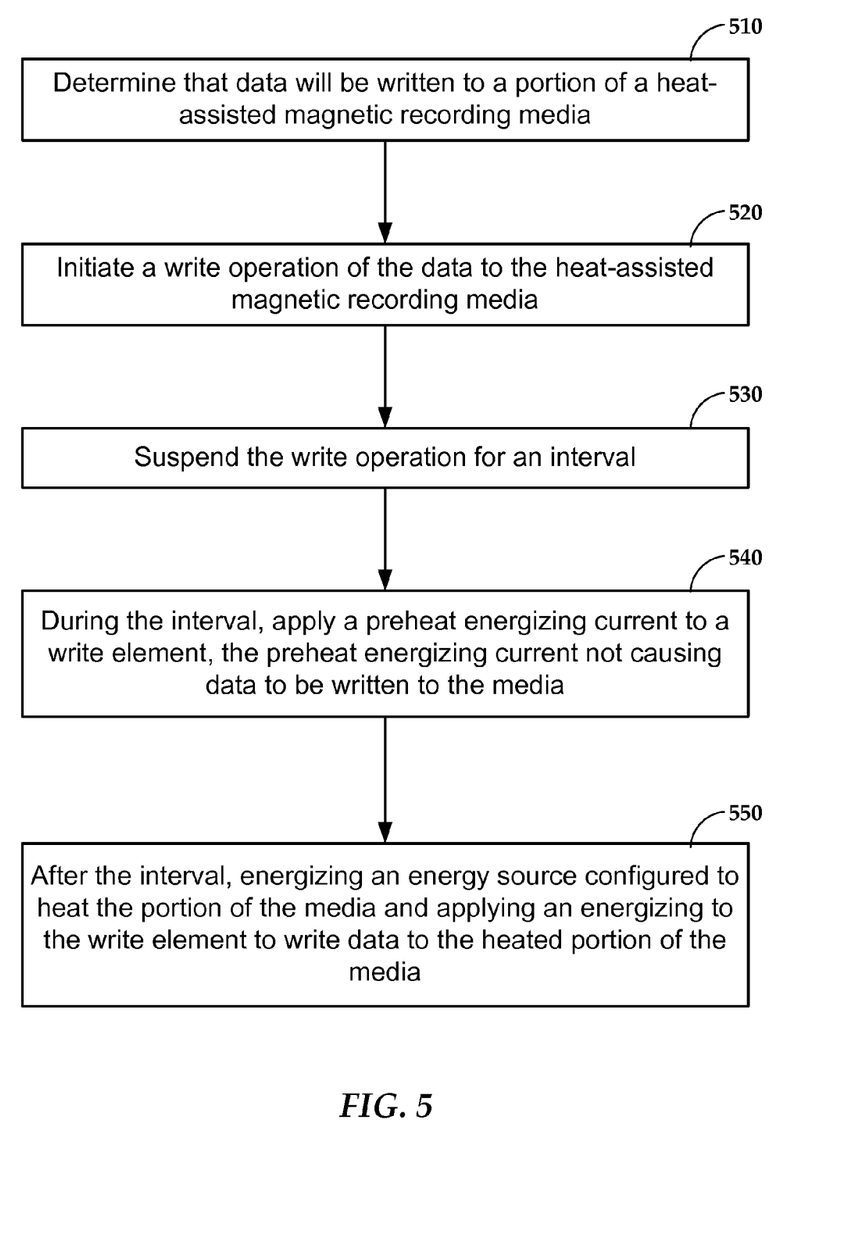
FIG. 5 is a flowchart illustrating a process according to various embodiments.

In FIG. 5, a flowchart illustrates a process for preheating a write element according to embodiments described herein. It is determined 510 that data will be written to a portion of a HAMR media. A write operation of the data to the heat-assisted magnetic recording media is initiated 520. A write operation is suspended 530 for an interval. According to various implementations, various fields (e.g. timing or servo fields) are read during the interval. A preheat energizing current is applied 540 to a write element, the write element applying a magnetic field to the media in response to the preheat energizing current, and the preheat energizing current not causing data to be written to the media and brings the writer into thermal equilibrium. After the interval, an energy source (e.g. a laser diode) is energized 550. In some cases, the write operation is resumed upon completion of the interval and the light source is re-energized. Resuming the write operation may include energizing the light source.

Figure 6:
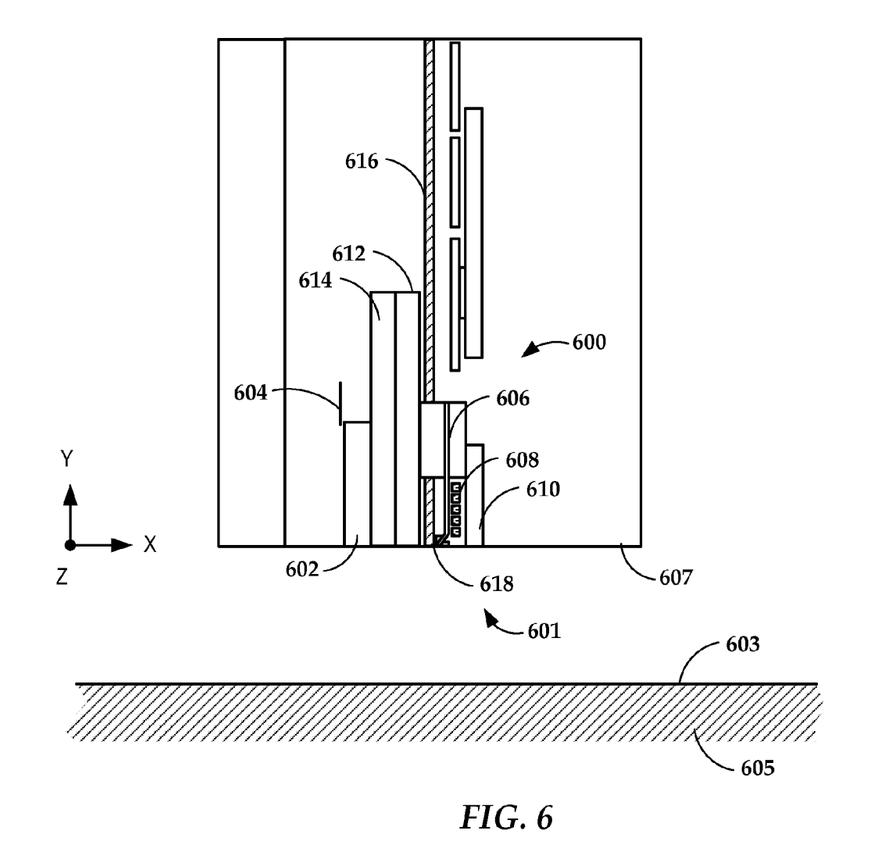
FIG. 6 is a cross-sectional view of a write head according to an example embodiment.

In reference now to FIG. 6, a cross-sectional diagram shows components of a read/write transducer 600 according to an example embodiment. This diagram shows a portion of a slider near a close-point region 601. In this view, the x-direction is down-track relative to the media, and the z-direction (normal to the plane of the page) is the cross-track direction. A read sensor 602 is located near the ABS 607. The read sensor may include a magnetoresistive stack and shielding. A reader heater 604 may be implemented to adjust local spacing between the read sensor 602 and a media surface 603.

A write pole 606 may include a ferromagnetic structure that extends to the ABS 607. A write coil 608 is energized to generate a magnetic field within the write pole 606 that extends to the media surface 603. The slider may be configured for perpendicular recording, wherein the magnetic orientation is perpendicular (oriented along the y-direction in this view) to the media surface 603. Accordingly, the slider may include one or more return poles 610, 612 that facilitate, along with a particular arrangement of layers in the medium 605, perpendicular orientation of the magnetic fields of the recorded data. A spacer 614 may be disposed between the read and write portions of the slider.

In order to write to the HAMR medium 605, the slider includes a waveguide 616 that extends towards the ABS 607. The waveguide 616 delivers light to a near-field transducer (NFT) 618 that is located at the ABS 607 proximate a tip of the write pole 606. The NFT 618 facilitates directing a beam of electromagnetic energy to the media surface 603 during write operations. The energy creates a small hotspot on the media surface 603 with lowered magnetic coercivity, enabling a magnetic field generated from the write pole 606 to affect magnetic orientation within the hotspot.

In some configurations, the spacer 614 (or some other region proximate the write pole 606 and/or return poles 610, 612) may also include a heater to adjust the head-to-media spacing of the write pole 606 independently from that of the read sensor 602. However, in this example, the slider does not include a separate heater. Instead, the write coil 608 can be activated to provide the heat that might normally be provided by that separate heater. Any magnetic fields generated by this activation of the coil 608 will not change data on the medium 605 so long as the light source is not activated to heat the media surface 603.

The illustrated example shows a reader heater 604 used with write coil 608 to independently control head-to-media clearances of read and/or write portions of transducer. In one example, the reader heater 604 controls head-media spacing of the read sensor 602, and the write coil 608, either alone or in combination with the reader heater 604, controls head-media spacing of the write pole 606. In another example, a different heater (e.g., one located proximate write portions of transducer 600) may be used to control head-media spacing of the write pole 606, and the write coil 608 (either alone or together with the different heater) is used to adjust head-media spacing of the read sensor 602, assuming the activation of the write coil 608 causes little or no interference with the read sensor 602.

Figure 7:
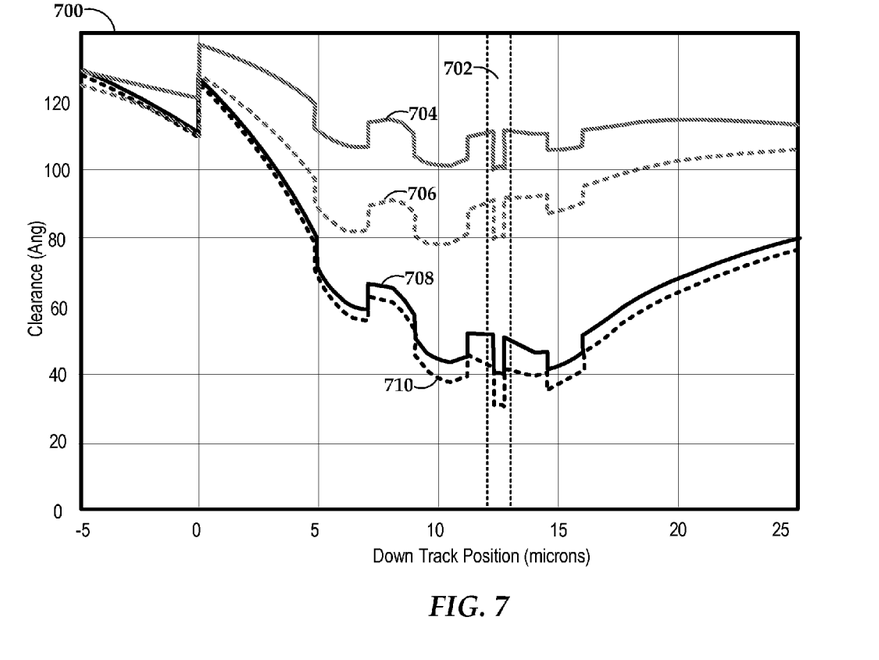
FIG. 7 is a graph illustrating write coil induced protrusion according to an example embodiment.

In reference now to FIG. 7, a graph 700 illustrates an example of ABS protrusions of a HAMR slider according to an example embodiment. In this graph 700, profiles of the ABS are represented as spacing/clearance between the ABS and media along the vertical axis, and downtrack position along the horizontal axis. Downtrack region 702 represents a close point (e.g., near the read or write transducer) of the ABS. Trace 704 represents the profile at an ambient temperature where no power is applied to either a heater or write coil. Trace 706 is the profile when heater alone is powered; trace 708 represents the profile when heater and write coil are energized; and trace 710 represents the profile when heater, write coil, and laser are all energized.

As the difference between traces 706 and 708 illustrate, the write coil alone may be able to generate enough heat to cause sufficient protrusion. Also, the write coil may be used in combination with one or more heaters operating together (instead of a dual heaters operating separately) to achieve desired clearances of both the write and read portions of a magnetic head at different times and/or states of the slider. For example, the write coil current can be set to a value that maximizes performance (at a constant head-media spacing) then, in parallel, use a dedicated heater to bring clearance to the desired value. This may be useful during write operations, where write coil activation for writing will cause some predictable amount of protrusion, and the dedicated heater could fine tune the clearances.

Various features of a read/write head may be designed in such a way as to fully take advantage of the writer protrusion as a mechanism for controlling head-media spacing. For example, a resistance of a write coil could be increased to induce higher temperatures for purposes of influencing head-media spacing. The write coil and/or surrounding areas could be designed with a higher coefficient of thermal expansion to increase protrusion. In another example, features designed to cool the write coil could be designed in such a way as to decrease cooling at the coil and proximate areas, e.g., using materials of lower thermal conductivity.

Figure 8:
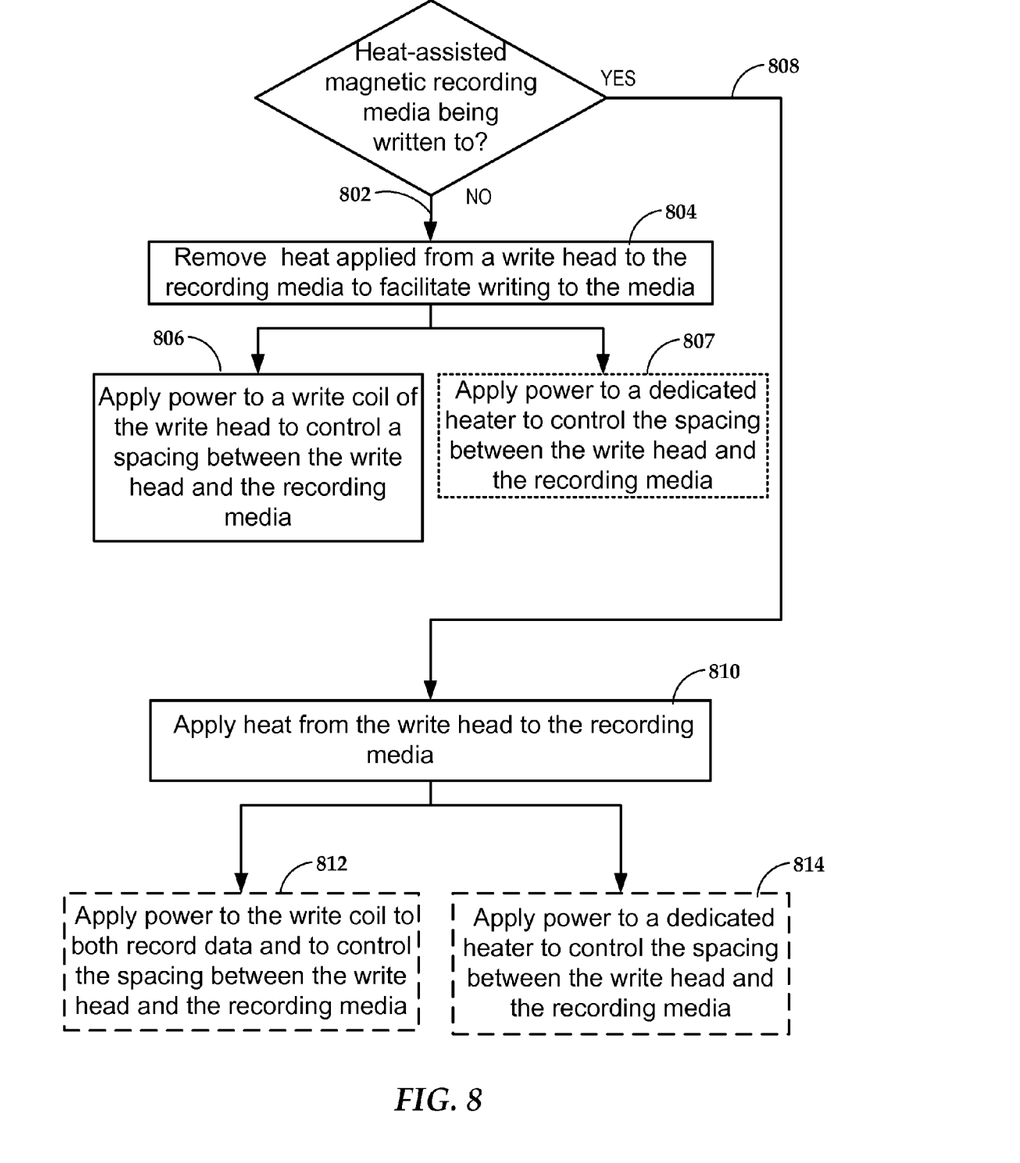
FIG. 8 is a flowchart illustrating a procedure according to an example embodiment.

In reference now to FIG. 8, a flowchart illustrates a procedure according to an example embodiment. In this procedure, a first path 802 is taken if a heat-assisted magnetic recording media is not being written to. In such a case, heat from a write head to the recording media is removed 804. This may involve turning off or disengaging a device (e.g., laser, optical pathway) that provides the heat. Power is applied 806 to write coil of the write head to control a spacing between the write head and the recording media when the media is not being written to. This may include spacing between a read and/or write element of the write head. Optionally, power may be applied 807 to a dedicated heater to control the spacing in parallel with the application 806 of power to the write coil.

Path 808 represents head-to-disk clearance operations that occur when the recording media is being written to, where at least a source of heat (e.g., laser light) is applied to the recording media. Heat is applied 810 from the write head to the recording media 810. One or both of operations 812 and 814 may be performed to adjust a clearance (e.g., clearance between media and read head and/or write pole) while the media is being written to. Operation 812 involves applying power to the write coil to both record data and to control spacing between the write head and the media. Operation 814 involves applying power to a dedicated heater to control the spacing between the write head and the media. This may be the same dedicated heater used at block 807.

An apparatus includes: a write element configured to magnetize a portion of a heat-assisted magnetic recording medium in response to an energizing current during a write operation; an energy source configured to heat the portion of the medium being magnetized by the write element; and wherein the energizing current is applied to the write element during an interval during which the write operation is suspended and the energy source is de-energized, wherein applying the energizing current to the write element does not cause other data to be written to the medium and the energizing current brings the write element and/or driver circuitry into thermal equilibrium prior to writing the data on the portion. The energy source may include a laser diode. The write operation may be resumed upon completion of the interval. Resuming the write operation may involve energizing the energy source. The apparatus may be configured to read timing fields during the interval.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
a write coil configured to apply a magnetic field to write data on a portion of a heat-assisted magnetic recording medium in response to an energizing current;
an energy source configured to heat the portion of the medium being magnetized by the write coil; and
wherein a preheat energizing current is applied to the write coil during an interval before writing the data to the portion of the medium, the energy source being de-energized during the interval, wherein the preheat energizing current applies the magnetic field to the medium, the magnetic field being sufficient to write to the medium when heated by the energy source but not causing other data to be written to the medium due to the energy source being de-energized, the preheat energizing current bringing at least one of the write coil and driver circuitry into thermal equilibrium prior to writing the data to the portion.

2. The apparatus of claim 1, wherein the energy source comprises a laser diode.

3. The apparatus of claim 1, wherein the preheat energizing current comprises an alternating current.

4. The apparatus of claim 3, wherein the alternating current is controlled by a system controller.

5. The apparatus of claim 3, wherein the alternating current is controlled by a preamp that drives the write coil.

6. The apparatus of claim 1, wherein the preheat energizing current comprises a direct current.

7. The apparatus of claim 1, wherein the medium comprises a bit patterned medium.

8. The apparatus of claim 7, wherein a unipolar field is traversed during the interval, wherein the energizing current is a direct current, and wherein the energy source is energized during the interval.

9. The apparatus of claim 7, wherein a bipolar field is traversed during the interval.

10. A method comprising:
determining that data will be written to a portion of a heat-assisted magnetic recording medium;
applying a preheat energizing current to a write coil during an interval before writing the data to the portion of the medium, wherein the preheat energizing current applies a magnetic field to the medium, the magnetic field being sufficient to write to the medium when heated by an energy source but not causing other data to be written to the medium due to the energy source being de-energized, the preheat energizing current bringing at least one of the write coil and driver circuitry into thermal equilibrium prior to writing the data on the portion;
after the interval, energizing an energy source configured to heat the portion of the medium and applying an energizing current to the write coil to write the data to the portion of the medium.

11. The method of claim 10, wherein the preheat energizing current comprises an alternating current.

12. The method of claim 11, further comprising controlling the alternating current via a system controller.

13. The method of claim 11, further comprising controlling the alternating current within a preamp that drives the write coil.

14. The apparatus of claim 1, wherein the preheat energizing current does not cause the other data to be written to the medium due to a magnetic coercivity of the medium.

15. The apparatus of claim 14, wherein heating the portion of the medium being magnetized by the write coil lowers the magnetic coercivity of the portion of the medium.

16. The method of claim 10, wherein the preheat energizing current does not cause the other data to be written to the medium due to a magnetic coercivity of the medium, and wherein heating the portion of the medium being magnetized by the write coil lowers the magnetic coercivity of the portion of the medium.

17. An apparatus comprising:
a logic circuit configured to perform:
determining that data will be written to a portion of a heat-assisted magnetic recording medium;
applying a preheat energizing current to a write coil during an interval before writing the data to the portion of the medium, wherein the preheat energizing current applies a magnetic field to the medium, the magnetic field being sufficient to write to the medium when heated by the energy source but not causing other data to be written to the medium due to the energy source being de-energized, the preheat energizing current bringing at least one of the write coil and driver circuitry into thermal equilibrium prior to writing the data on the portion; and
after the interval, energizing an energy source configured to heat the portion of the medium and applying an energizing current to the write coil to write the data to the portion of the medium.

18. The apparatus of claim 17, wherein the preheat energizing current does not cause other data to be written to the medium due to a magnetic coercivity of the medium, and wherein heating the portion of the medium being magnetized by the write coil comprises lowering the magnetic coercivity of the portion of the medium.

19. The apparatus of claim 17, wherein the application of the preheat energizing current further adjusts a head-media spacing of a read sensor.

* * * * *